United States Patent [19]
Miyauchi et al.

[11] 4,390,460
[45] Jun. 28, 1983

[54] LITHIUM OXIDE BASED AMORPHOUS MATERIAL AND PROCESS FOR PREPARATION THEREOF

[75] Inventors: Katsuki Miyauchi, Hino; Tetsu Oi, Tokyo; Tsuneo Suganuma, Tokorozawa, all of Japan

[73] Assignee: Hitachi, Ltd., Tokyo, Japan

[21] Appl. No.: 306,600

[22] Filed: Sep. 28, 1981

[30] Foreign Application Priority Data

Sep. 29, 1980 [JP] Japan .................................. 55-134436

[51] Int. Cl.$^3$ .............................................. H01B 1/06
[52] U.S. Cl. .................................... 252/518; 429/191; 429/193; 423/299; 423/325; 423/332
[58] Field of Search ............... 252/518; 429/191, 193; 423/299, 325, 332

[56] References Cited

U.S. PATENT DOCUMENTS 4,184,015  1/1980  Reau et al. ........................ 252/518

Primary Examiner—J. L. Barr
Attorney, Agent, or Firm—Antonelli, Terry & Wands

[57] ABSTRACT

Disclosed is a lithium oxide based amorphous material having a composition included in a region defined by lines connecting points A, B, C and D in the composition diagram of the ternary system of $Li_2O \cdot SiO_2 \cdot P_2O_5$ shown in FIG. 1 of the accompanying drawings. This amorphous material can be formed by performing sputtering by using as a target a mixture of a lithium silicate/lithium phosphate composition and $LiO_2$. This amorphous material is excellent in the ionic conductivity.

9 Claims, 4 Drawing Figures

LITHIUM OXIDE BASED AMORPHOUS MATERIAL AND PROCESS FOR PREPARATION THEREOF

BACKGROUND OF THE INVENTION (1) Field of the Invention

The present invention relates to a lithium oxide based amorphous material and a process for the preparation thereof.

(2) Description of the Prior Art

The interest in a solid lithium ion conductor has recently been increasing. Especially, utilization of a lithium ion conductor as a solid electrolyte of a lithium cell or an electrolyte of an electrochromic display device has been developed. In the former case, since the requirement for reduction of the thickness of the cell has been increasing with recent requirements for minimization of the sizes of electronic devices and reduction of the thickness thereof, application fields have been abruptly expanded. For example, a lithium cell comprising an evaporated film of LiI as a solid electrolyte is proposed in J. Electro. Chem. Soc., Vol. 116, No. 10, pages 1452 (1969). This evaporated film, however, consists of a polycrystalline body having a thickness of about 10 to about 15 $\mu$m, and the ionic conductivity of the film is about $10^{-7}$ mho·cm$^{-1}$.

In the latter case, the above-mentioned solid electrolyte is used so as to render the electrochromic display device totally solid and stabilize the structure of the device.

In both the cases, it has been desired to develop a solid electrolyte having a high ionic conductivity and being stable in an ordinary atmosphere. At the present, however, since the resistance to the ionic conduction in the solid electrolyte is high, no satisfactory device of the above-mentioned type has practically been developed.

As means for increasing the ionic conductivity of the above-mentioned device, there can be considered a method in which the solid electrolyte is formed into a thin film to geometrically reduce the resistance. According to the conventional ceramic technique, however, it is difficult to form a thin film having a thickness smaller than 10 $\mu$m. Furthermore, according to the conventional film-forming technique such as the CVD method or sputtering method, a thin film having a high ionic conductivity cannot be obtained. The reason is that the temperature for the synthesis of an oxide based solid electrolyte is high, an alkali metal oxide is lost by evaporation or the like during formation of a thin film and control of the composition is therefore difficult.

On the other hand, the following reference is cited to show the state of the art: that is, J. Electro. Chem. Soc., Vol. 124, No. 8, page 1240 (1977).

SUMMARY OF THE INVENTION

It is a primary object of the present invention to provide a lithium oxide based amorphous material having an excellent ionic conductivity and a process for the preparation thereof.

Another object of the present invention is to provide a lithium oxide based amorphous thin film and a process for the preparation thereof.

These and other objects of the present invention can be attained by a lithium oxide based amorphous material having a composition included within a region defined by lines connecting points A, B, C and D to one another in the composition diagram of the ternary system of $Li_2O·SiO_2·P_2O_5$ which is shown in FIG. 1.

DETAILED DESCRIPTION OF THE PREFERRED EMBODIMENTS

Figure 1:
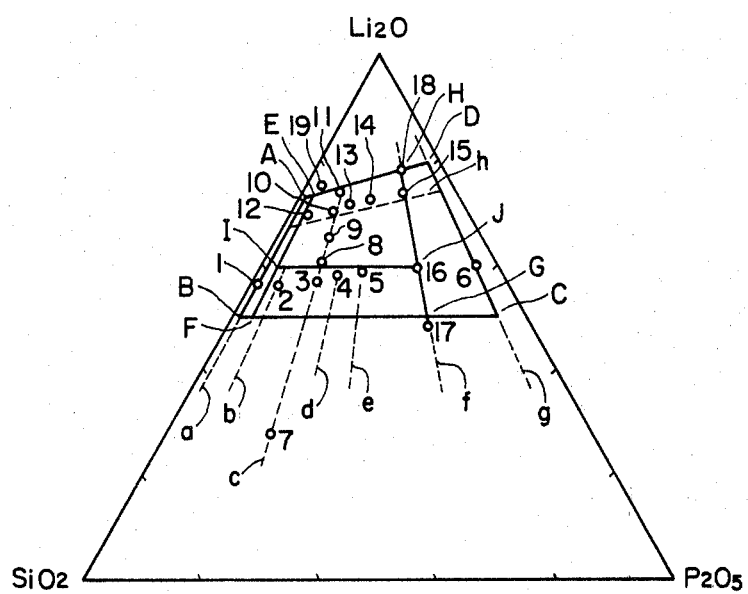
FIG. 1 is a composition diagram of the ternary system of $Li_2O·SiO_2·P_2O_5$.

The region defined by lines connecting points A, B, C and D to one another in the ternary system composition diagram of FIG. 1 is a region represented by the following formula:

$$(2.5-x/2) \sim (1-x/2)LiO_2 \cdot (1-x)SiO_2 \cdot (x/2)P_2O_5$$

From the results of the electron beam diffractiometry and X-ray diffractiometry of thin films obtained in Examples given hereinafter, it has been confirmed that solid solutions having a composition represented by the above formula are amorphous.

These films have an excellent ionic conductivity. From the viewpoint of the ionic conductivity, it is preferred that the amorphous material of the present invention should have a composition included in the region defined by lines connecting points E, F, G and H in FIG. 1, especially be lines connecting points E, I, J and H in FIG. 1.

As the material having a composition included within the above-mentioned region, there is known a polycrystalline body having a composition of, for example, $(1-x)Li_4SiO_4 \cdot xLi_3PO_4$. However, since this body is a sintered body, only a product having a thickness of several millimeters is obtained and the resistance of this sintered body is very high. Accordingly, this sintered body can hardly be used as a lithium ion conductor of the above-mentioned device.

The amorphous material of the present invention can be obtained in the form of a thin film having a thickness of 0.1 to 50 $\mu$m, preferably about 1 to about 20 $\mu$m, and therefore, the resistance is low. Accordingly, the amorphous material of the present invention can be effectively used as a lithium ion conductor of the above-mentioned device.

The amorphous material of the present invention can be prepared according to the sputtering method by using as the target a mixture comprising (1) a lithium silicate/lithium phosphate composition represented by the general formula $(1-x)Li_4SiO_4 \cdot xLi_3PO_4$ wherein x is a value in the range of $0.05 \leq x \leq 0.95$ or a mixture capable of forming said lithium silicate/lithium phosphate composition by sputtering and (2) a lithium compound capable of forming $Li_2O$ by sputtering, for example, $Li_2O$.

The above general formula $(1-x)Li_4SiO_4 \cdot xLi_3PO_4$ can be rewritten as $(2-x/2)Li_2O \cdot (1-x)SiO_2 \cdot (x/2)P_2O_5$, and it indicates a composition shown by a dotted line h in the ternary system composition diagram of FIG. 1. If only the lithium silicate/lithium phosphate composition is used as the target without mixing of $Li_2O$ or the like and sputtering is carried out, the resulting composition is one formed by removing $Li_2O$ from the starting material composition, that is, $(1-x)Li_4SiO_4 \cdot xLi_3PO_4 - nLi_2O$. On the other hand, if $Li_2O$ is added to the above starting material according to the present invention and sputtering is carried out, a product having a composition corresponding substantially to the above general formula $(1-x)Li_4SiO_4 \cdot xLi_3PO_4$ can be obtained. If the amount incorporated of $Li_2O$ or the like is increased, a product having a composition in which the content of $Li_2O$ is higher than in the composition of the above general formula can be obtained.

More specifically, if the ratio of lithium silicate/lithium phosphate of the starting material, that is, the value of x, is determined, the corresponding position in the composition diagram of FIG. 1 should naturally be determined. In short, a corresponding point on the dotted line h is determined. Supposing that x is 0.40, the composition corresponds to the crossing point of the dotted lines h and c. If sputtering is carried out by using the starting material having this composition as the target, as pointed out hereinbefore, the resulting product has a composition formed by removing $Li_2O$ from the composition of the starting material, that is, a composition on the dotted line c or an extension thereof, which is below the crossing point of the dotted lines h and c and is very close to the line of $Li_2O=O$. If a mixture of the above composition and $Li_2O$ is used as the target, the product has a composition on the dotted line c or an extension thereof and is located at a higher position (on the side of $Li_2O$) with increase of the proportion of $Li_2O$.

For example, if 1 mole (per mole of the starting composition; the same will hold good hereinafter) of $Li_2O$ is mixed, the obtained product has a composition at point 7. If the amount of $Li_2O$ to be mixed is increased to 2, 3, 4, 5 or 7 moles, the product comes to have a composition at point 3, 8, 9, 10 or 11 on the dotted line c.

If the amount added of $Li_2O$ is further increased, a product having a composition in which the proportion of $Li_2O$ is increased, for example, a composition located above a line connecting points A and D in FIG. 1 (on the side of $Li_2O$), is obtained. This composition, however, is not preferred from the viewpoint of the ionic conductivity. Accordingly, it is preferred that sputtering be carried out by using $Li_2O$ in an amount of up to 8 moles.

Also a product having a composition having too small an amount of $Li_2O$, for example, a composition below the line B-C in FIG. 1 (located below the line B-C in FIG. 1), is inferior in the ionic conductivity. Therefore, it is preferred that the amount of $Li_2O$ to be mixed be at least 1.5 moles, especially at least 1.8 moles.

It is preferred that the lithium silicate/lithium phosphate composition to be used as the target be a lithium silicate/lithium phosphate solid solution formed by ball-milling the starting materials and sintering them to effect solid phase reaction. The reason is that since the ratio of $P_2O_5$ and $Si_2O$ can be kept constant in the product, namely since the product has, for example, a composition on the dotted line c in FIG. 1 or an extension thereof, only by determining the amount of $Li_2O$, a solid solution having a desirable composition can easily be obtained. When the starting composition is used in the form other than such solid solution, it sometimes happens that the composition of the product deviates from the dotted line c. Incidentally, the dotted lines a, b, c, d, e, f and g in FIG. 1 indicate compositions of products obtained when the values of x are 0.05, 0.20, 0.40, 0.50, 0.60, 0.80 and 0.95, respectively. If the value of x is smaller than 0.05 or larger than 0.95, no good ionic conductivity can be obtained.

As pointed out hereinbefore, a lithium compound capable of forming $Li_2O$ by sputtering can be used as well as $Li_2O$. However, compounds containing elements reactive with the product as elements other than lithium and oxygen, such as halogens, are not preferred. Accordingly, in the present invention, it is preferred that at least one compound selected from the group consisting of $Li_2O$, $Li_2CO_3$ and $LiOH$ be used.

It is preferred that such compound be used in an amount of 3 to 16 moles as the lithium atom per mole of the composition, namely 1.5 to 8 moles as the $Li_2O$ compound as pointed out hereinbefore.

The mixture of the lithium silicate/lithium phosphate composition and the lithium compound may be used in the form of a powder formed merely by mixing the two components or after molding and sintering of such powder.

The present invention will now be described in detail with reference to the following Examples that by no means limit the scope of the invention.

EXAMPLES 1 THROUGH 6

Starting powders of $SiO_2$, $Li_2CO_3$ and $Li_3PO_4$ were weighed and mixed so that the ratio of Li, Si and P corresponded to $(1-x)Li_4SiO_4 \cdot xLi_3PO_4$ in which x was 0.05, and the mixture was reacted at 1000° C. for 3 hours to obtain a composition represented by the above formula.

Similarly, the respective starting powders were weighed and mixed so that the ratio of Li, Si and P corresponded to $(1-x)Li_4SiO_4 \cdot xLi_3PO_4$ in which x was 0.2, 0.4, 0.5, 0.6 or 0.95, and the mixture was reacted at 1000° C. for 3 hours to obtain a composition of the above formula in which x indicated the above-mentioned value.

The so-formed composition was mixed with $Li_2CO_3$ in an amount of 2 moles per mole of the composition, and the mixture was sintered again at 1100° C. A thin film was prepared according to the sputter-up method by using the sintered product as the target. More specifically, sputtering was carried out under a degree of vacuum of $2 \times 10^{-2}$ mm Hg at a plate voltage of 2 KV and a deposition rate of 0.5 $\mu$m/hr with a discharge gas of $Ar/O_2$ (60/40) to form a thin film having a thickness of about 2 $\mu$m on a quartz glass substrate, while the substrate was being cooled with water to prevent elevation of the substrate temperature.

From the results of the wet chemical analysis of the so-obtained thin films obtained by using as the target the composition in which x was 0.05, 0.2, 0.4, 0.5, 0.6 or 0.95, it was found that the thin films had compositions corresponding to points 1, 2, 3, 4, 5 and 6, respectively, in FIG. 1. For example, the point 2 indicates a composition of $0.56Li_2O \cdot 0.39SiO_2 \cdot 0.05P_2O_5$.

Figure 2:
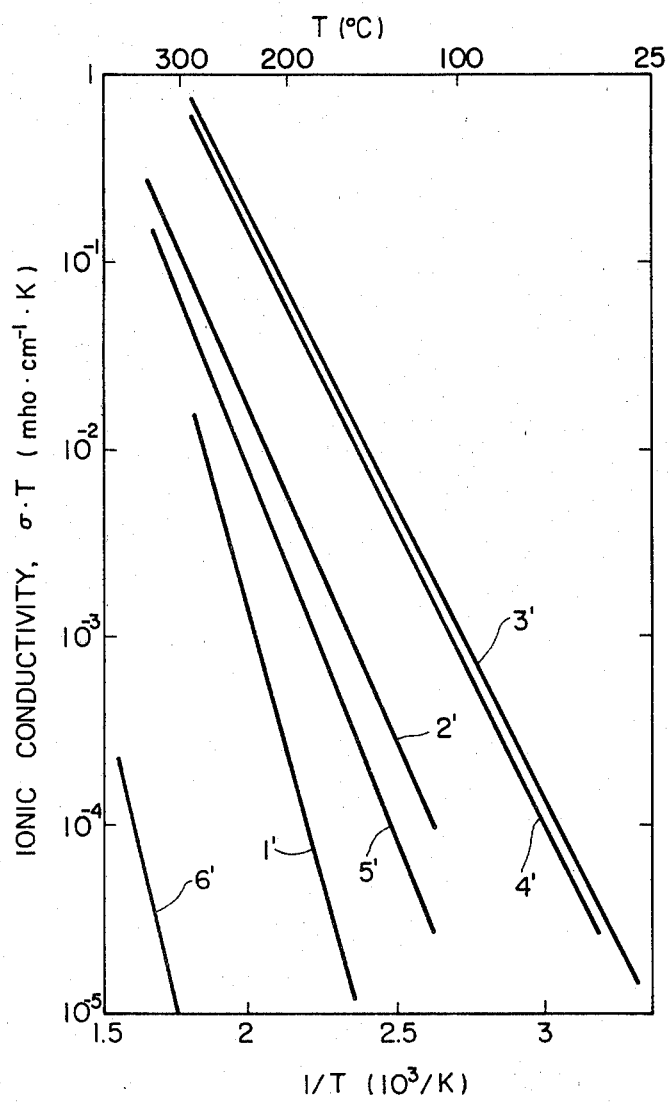
FIGS. 2, 3 and 4 are diagrams showing the temperature dependency of the ionic conductivity, which are given for illustrating the present invention.

The ionic conductivities (at room temperature) of these thin films determined according to the AC measurement method using a blocking electrode are shown in Table 1, and the temperature dependencies thereof are shown in FIG. 2 in which points 1', 2', 3', 4', 5' and 6' indicate the ionic conductivities of the thin films having compositions at the points 1, 2, 3, 4, 5 and 6, respectively, in FIG. 1.

The thin film of the present invention has an ionic conductivity lower by about one order than that of a ceramic body (sintered body) prepared by the conventional process, even though the thin film of the present invention is amorphous.

TABLE 1

| Example No. | Value x | Ionic Conductivity (mho · cm$^{-1}$) |
| --- | --- | --- |
| 1 | 0.05 | <10$^{-10}$ |
| 2 | 0.2 | 1 × 10$^{-9}$ |
| 3 | 0.4 | 4 × 10$^{-8}$ |
| 4 | 0.5 | 3.2 × 10$^{-8}$ |
| 5 | 0.6 | 5 × 10$^{-10}$ |
| 6 | 0.95 | <10$^{-10}$ |

EXAMPLES 7 THROUGH 11

A composition in which x was 0.4, that is, a composition represented by the formula 0.6Li$_4$SiO$_4$·0.4Li$_3$PO$_4$, was prepared according to the same method as described in Examples 1 through 6.

Figure 3:
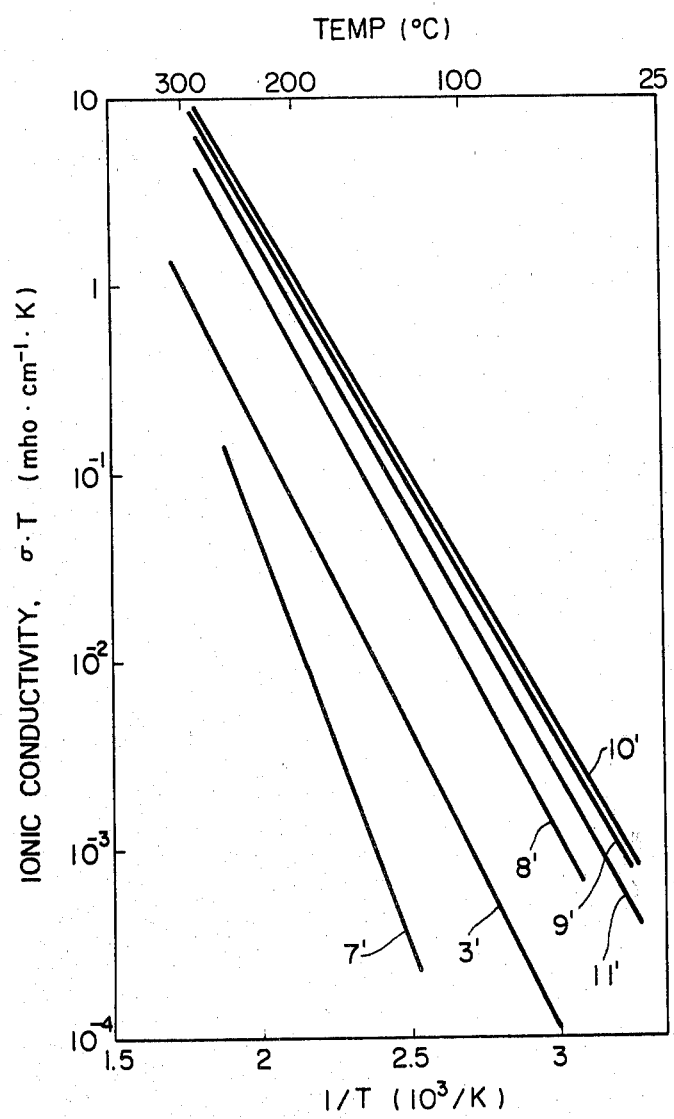

LiO$_2$ was added in an amount shown in Table 2 per mole of the so-obtained composition, and in the same manner as described in Examples 1 through 6, the mixture was formed into a target and a thin film was prepared. The position numbers of the compositions of the obtained thin films in FIG. 1 and the ionic conductivities (at room temperature) of the thin films determined in the same manner as described in Examples 1 through 6 are shown in Table 2. The temperature dependencies of the ionic conductivities are shown in FIG. 3, in which points 7', 8', 9', 10' and 11' indicate the characteristics of the thin films obtained in Examples 7, 8, 9, 10 and 11, respectively, and the point 3' indicates the characteristic at the point 3' for the purpose of comparison.

TABLE 2

| Example No. | Amount (moles per mole of starting composition) of Li$_2$O | Position Number of Composition | Ionic Conductivity (mho · cm$^{-1}$) |
| --- | --- | --- | --- |
| 7 | 1 | 7 | <10$^{-10}$ |
| 8 | 3 | 8 | 4 × 10$^{-7}$ |
| 9 | 4 | 9 | 1.5 × 10$^{-6}$ |
| 10 | 5 | 10 | 1.7 × 10$^{-6}$ |
| 11 | 7 | 11 | 8.7 × 10$^{-7}$ |

EXAMPLES 12 THROUGH 19

The same lithium silicate/lithium phosphate compositions as used in Examples 2, 4 and 5 and compositions where the mixing ratio of the starting materials are changed and the value x was adjusted to 0.8 were synthesized, and they were mixed with Li$_2$O in various amounts. The mixtures were treated in the same manner as described in Examples 1 through 6 to obtain films having compositions corresponding to position numbers of 12 through 19 in FIG. 1. The position numbers in FIG. 1 correspond to the Example numbers. More specifically, the thin films obtained in Examples 12, 15, 16 and 18 had compositions of 0.69Li$_2$O·0.28SiO$_2$·0.03-P$_2$O$_5$, 0.74Li$_2$O·0.09SiO$_2$·0.17P$_2$O$_5$, 0.59Li$_2$O·0.14SiO$_2$·0.27P$_2$O$_5$, respectively.

The ionic conductivities of the so-obtained thin films (at room temperature) are shown in Table 3.

TABLE 3

| Example No. | Ionic Conductivity (mho · cm$^{-1}$) |
| --- | --- |
| 12 | 2 × 10$^{-7}$ |
| 13 | 1.6 × 10$^{-6}$ |
| 14 | 5.5 × 10$^{-7}$ |
| 15 | 8 × 10$^{-9}$ |
| 16 | 1 × 10$^{-10}$ |
| 17 | <10$^{-10}$ |
| 18 | 4 × 10$^{-9}$ |

TABLE 3-continued

| Example No. | Ionic Conductivity (mho · cm$^{-1}$) |
| --- | --- |
| 19 | 7 × 10$^{-8}$ |

EXAMPLE 20

Figure 4:
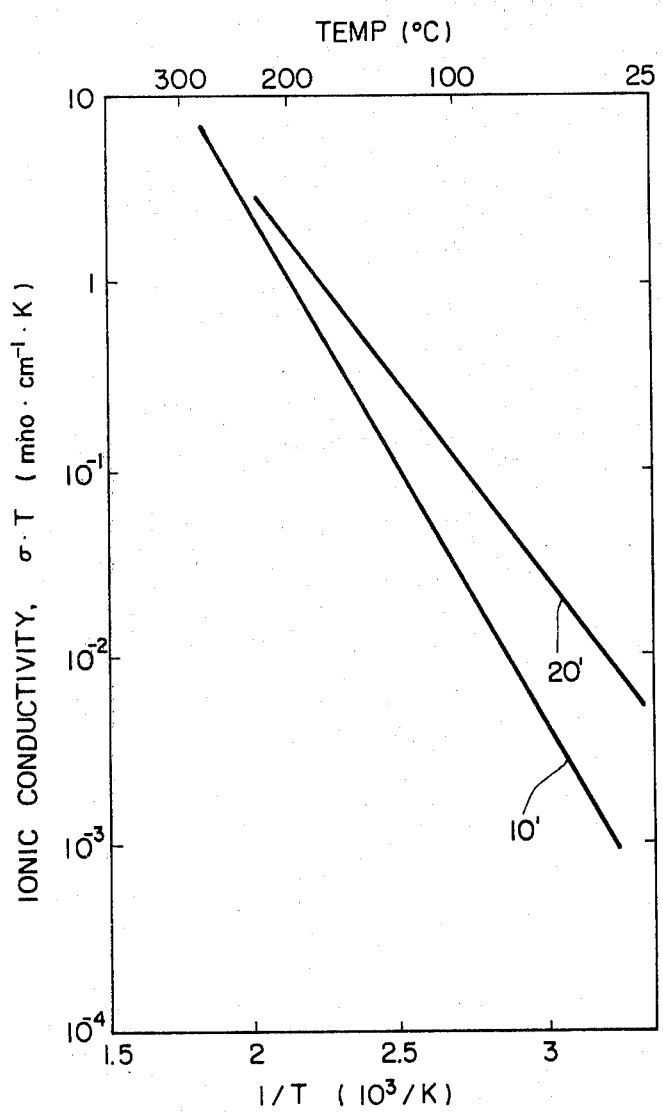

Sputtering was carried out by using as the target the same mixture of 0.6Li$_4$SiO$_4$·0.4Li$_3$PO$_4$ and 5Li$_2$O as used in Example 10, while the substrate holder was cooled by liquid nitrogen so as to maintain the substrate temperature below −20° C. during the sputtering step. The composition of the obtained thin film was the same as that of the thin film obtained in Example 10, but the ionic conductivity (20' in FIG. 4) of the thin film obtained in this Example was excellent over that (10' in FIG. 4) of the thin film obtained in Example 10.

As will readily be understood from the foregoing description, according to the present invention, a thin film having a much higher ionic conductivity can be obtained even if the thickness is smaller than 5 μm. Since the thickness of the thin film according to the present invention is about 1/1000 of that of a bulk material, and therefore, the resistance of the device to conduction of ions can be reduced to about 1/1000. Accordingly, it is expected that prominent effects can be attained when the thin film is used as a solid electrolyte for various devices. Furthermore, although the thin film of the present invention is amorphous, it has an ionic conductivity comparable to that of the crystalline body, and therefore, the thin film need not be crystallized by a heat treatment after sputtering. It is expected that the thin film of the present invention will be very valuable as a material for various electronic devices.

What is claimed is:

1. A lithium oxide based amorphous material which has a thickness of 0.1 to 50 μm and which has a composition included in a region defined by lines connecting points A, B, C and D to one another in a composition diagram of the ternary system of Li$_2$O·SiO$_2$·P$_2$O$_5$ shown in FIG. 1 of the accompanying drawings.

2. A lithium oxide based amorphous material as set forth in claim 1, wherein the composition of the amorphous material is included in a region defined by lines connecting points E, F, G and H in said composition diagram of the ternary system of Li$_2$O·SiO$_2$·P$_2$O$_5$.

3. A lithium oxide based amorphous material as set forth in claim 1, wherein the composition of the amorphous material is included in a region defined by lines connecting points E, I, J and H in said composition diagram of the ternary system of Li$_2$O·SiO$_2$·P$_2$O$_5$.

4. A process for the preparation of lithium oxide based amorphous materials having a thickness of 0.1 to 50 μm and having a composition included in a region defined by lines connecting points A, B, C and D in the composition diagram of the ternary system of Li$_2$O·SiO$_2$·P$_2$O$_5$ shown in FIG. 1 of the accompanying drawings, which comprises performing sputtering by using as a target a mixture comprising a lithium silicate/lithium phosphate composition having a general formula $(1-x)$Li$_4$SiO$_4$·$x$Li$_3$PO$_4$ where x is a value in the range of $0.05 \leq x \leq 0.95$ or a mixture capable of forming said lithium silicate/lithium phosphate composition by sputtering and a lithium compound capable of forming Li$_2$O by sputtering, said lithium compound being incorporated into said mixture in an amount of 3 to 16 moles as the lithium atom per mole of lithium silicate/lithium phosphate composition.

5. A process for the preparation of lithium oxide based amorphous materials according to claim 4, wherein the lithium silicate/lithium phosphate composition in a solid solution.

6. A process for the preparation of lithium oxide based amorphous materials according to claim 4, wherein the lithium compound is at least one compound selected from the group consisting of $Li_2O$, $Li_2CO_3$ and LiOH.

7. A process for the preparation of lithium oxide based amorphous materials according to claim 6, wherein the lithium compound is $Li_2O$.

8. A process for the preparation of lithium oxide based amorphous materials according to claim 6, wherein the lithium compound is $Li_2CO_3$.

9. A process for the preparation of lithium oxide based amorphous materials according to any one of claims 4, 5, and 6 through 8, wherein x in the above general formula is a value in the range of $0.10 \leq x \leq 0.80$, and a lithium oxide based amorphous material having a composition included in a region defined by lines connecting points E, F, G and H in said composition diagram of the ternary system of $Li_2O \cdot SiO_2 \cdot P_2O_5$ is prepared.

* * * * *